J. A. GROSE.
AUTOMOBILE RAILWAY.
APPLICATION FILED DEC. 8, 1913.

1,106,507.

Patented Aug. 11, 1914.
2 SHEETS—SHEET 1.

J. A. GROSE.
AUTOMOBILE RAILWAY.
APPLICATION FILED DEC. 8, 1913.

1,106,507.

Patented Aug. 11, 1914.
2 SHEETS—SHEET 2.

Witnesses
J. P. Britt
Reed Stanton

Inventor
John A. Grose
By
Attorneys

UNITED STATES PATENT OFFICE.

JOHN A. GROSE, OF SIOUX FALLS, SOUTH DAKOTA.

AUTOMOBILE-RAILWAY.

1,106,507.          Specification of Letters Patent.     Patented Aug. 11, 1914.

Application filed December 8, 1913. Serial No. 805,476.

*To all whom it may concern:*

Be it known that I, JOHN A. GROSE, a citizen of the United States, residing at Sioux Falls, in the county of Minnehaha and State of South Dakota, have invented certain new and useful Improvements in Automobile-Railways; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in track-ways or rails, more especially for automobile-travel or other like vehicle travel.

The invention has for its object, among other things, to provide especially against mutilating or tearing up roadways, either those macadamized or otherwise surfaced.

A further object is to promote the travel or running of automobiles, automobile-trucks, or other vehicles.

A still further object is to carry out these ends in a simple, effective and expeditious manner, and with facility.

The invention consists of certain features of construction, including making the track-forming members or rails individually either in longitudinal sections or in a single piece, the same being adapted to conform in their upper superficial surfaces or areas to the tread or rounded perimetric surfaces of the wheel-tires.

The invention also consists of providing such rail-members with lateral extensions, or approaches to provide for the ready passage of the automobile or vehicle thereon from the roadway or surface.

The invention also consists of certain details of construction and arrangement of the parts substantially as hereinafter more fully disclosed and defined by the appended claims.

The accompanying drawing illustrates the preferred embodiment of my invention wherein it will be understood that various changes and modifications with respect to the detailed construction and arrangement of the parts may be made without departing from the spirit of my invention, and in which drawing—

Figure 1:
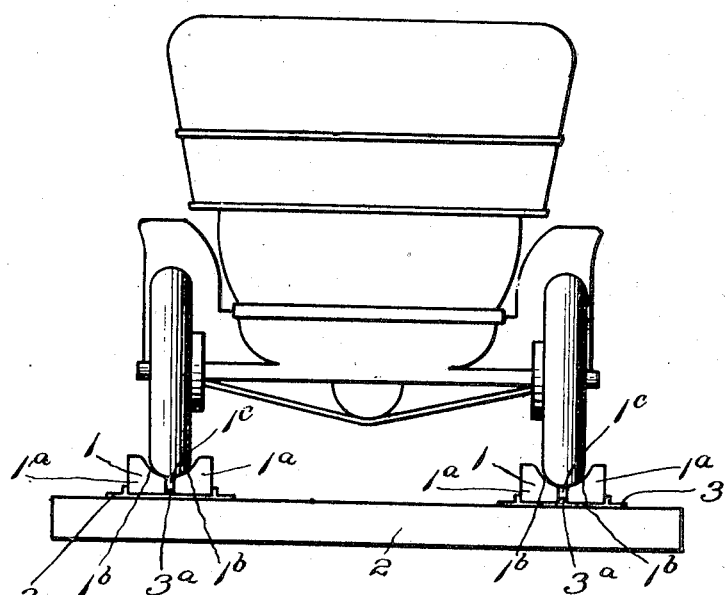
Figure 2:
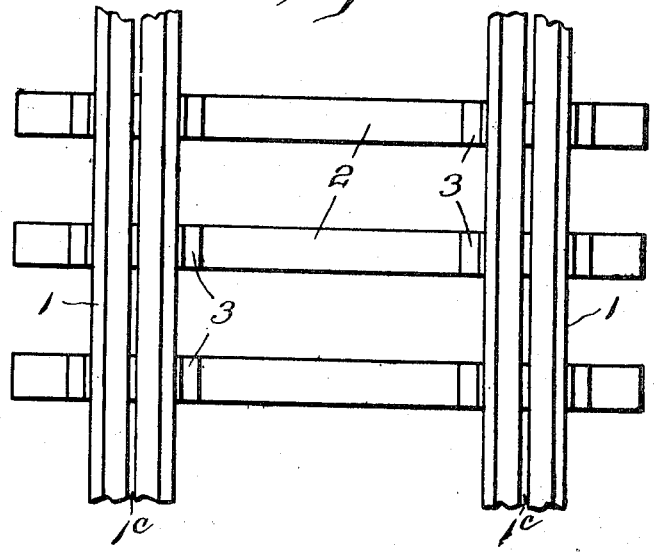
Figure 3:
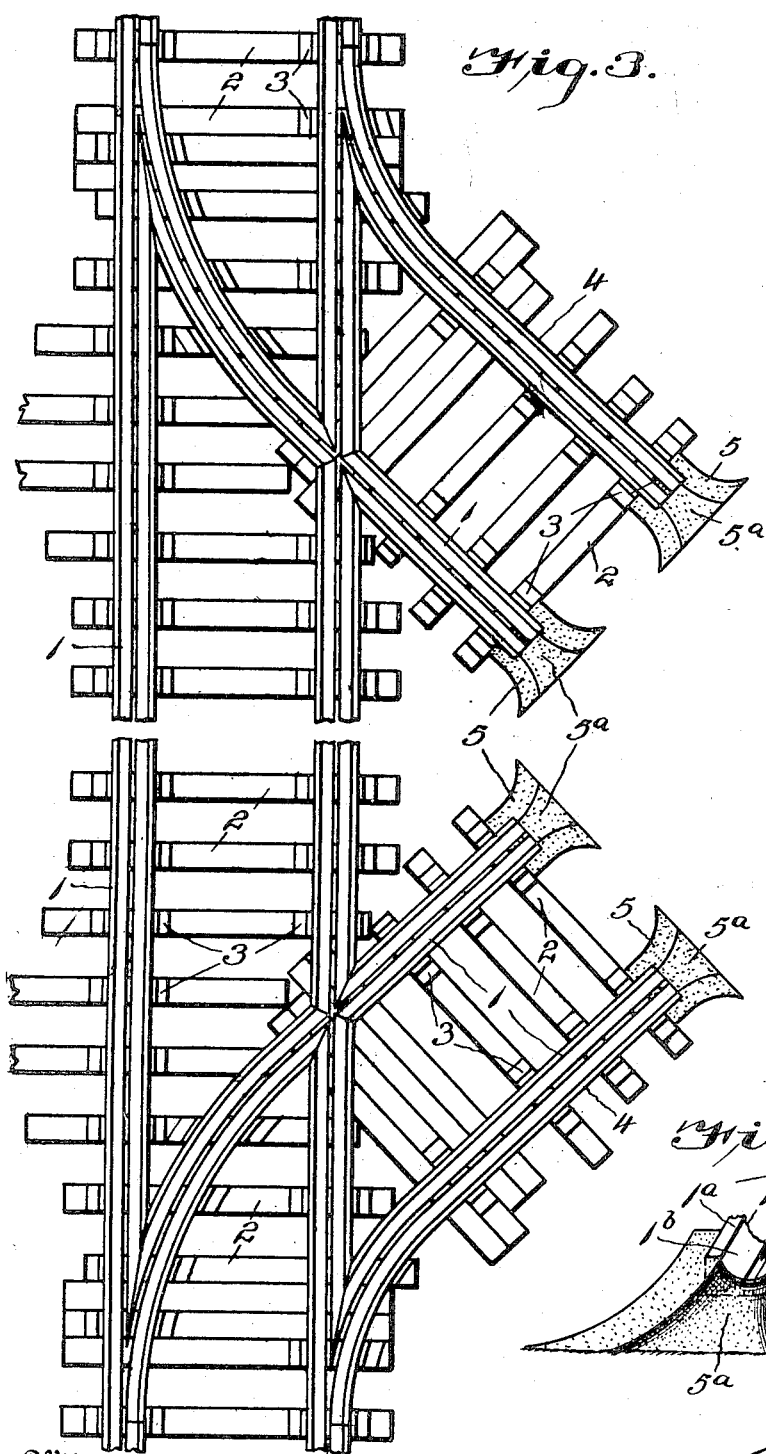
Figure 5:
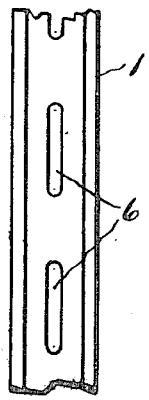
Figure 4:
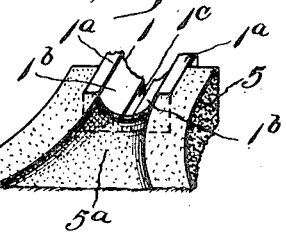

Figure 1 is an end elevational view, disclosing my invention, with an automobile thereon. Fig. 2 is a fragmentary plan view of my invention, the vehicle being removed. Fig. 3 is a broken plan view of the same showing more especially the lateral extensions or approaches thereof. Fig. 4 is a detailed perspective view disclosing more fully a concrete-embedded or anchored lower end of a lateral extension or approach rail. Fig. 5 is a fragmentary plan view showing a modification of my invention, more particularly with respect to the drainage, or dirt or other extraneous material means of escape from the track-rails or members.

In carrying out my invention, I provide, in laying or making the track-way, rails 1 which are suitably supported in position upon transverse members or ties 2, said rails, in the present instance, individually, being formed of two or duplicate longitudinal sections or members $1^a$, each section or member being curved or arcuate in its upper surface as at $1^b$, the curvatures in the two upper surfaces of the sections or members conjointly forming a concavity or groove in the thus formed sectional rail. The sections or members $1^a$ are suitably spaced apart as at $1^c$ to provide for drainage and to avoid accumulations of material of any character in the rail grooves, such material being displaced or carried downwardly into and through the thus formed spaces by the rolling action of the vehicle or automobile wheels entering said grooves, such material finally escaping therethrough together with the drainage.

The rails 1 are suitably received within and secured in position by means of chair-plates 3 spiked or otherwise held to the transverse members or ties 2, said chair-plates being suitably cast or adapted for the retention of the rail-members $1^a$ in their spaced apart position, it may be, by providing said chair-plates with intermediate upstanding studs $3^a$ received between within the space said rail-members, as doubtless will be appreciated.

Laterally and diagonally, or at a suitable angle, extend from the rails of the track-way short additional tracks or approaches 4 for the passage of the automobile or other vehicle thereupon, these track approaches or extensions being identical in construction with respect to the rail-members thereof and the positioning or supporting and securing the same upon their ties or transverse members.

The lateral track-extensions or approaches 4 have their approach or entrance ends suitably anchored or imbedded in concrete 5 or other suitable hardening plastic material, the latter itself being suitably dished or conformed in its upper surface as at 5ª to the curvature or outline of the groove in the rail as clearly seen in Fig. 4, the dished or groove-conforming surface 5ª inclining or sloping from the end of the rail downwardly to the road surface for the ready ascent thereof by the vehicle wheels, and of course for facility or movement of the latter in descending the same.

As above indicated, it is apparent that this invention, as embraced in the track-rails and the adjunctive parts, including the end concrete embedded approaches, provides effectively against the mutilating or tearing up of roadways which is experienced by the travel of automobiles, automobile-trucks and other vehicles thereover, even when macadamized or similarly surfaced.

The device is also quite simple, readily constructed or applied, and with facility.

In the modification, as suggested by Fig. 5, the drainage of the rails and displacement of accumulations of material of any character may be disposed of by providing the rails with oblong openings or slots 6 instead of casting or forming the rails in longitudinal sections or members and spacing the latter apart, as above described.

I claim:—

1. A device of the type described, including a track-way formed of rails individually in longitudinal sections or members, means for their retention in position comprising chair-plates adapted to receive said rail-members, said chair-plates having upstanding spacing studs received between said rail-members.

2. A device of the type described, including a track-way formed of upper surface grooved rails individually in longitudinal sections and rail approaches, the approach-ends of the latter being embedded in a plastic material conformed to the outline of the grooved surface of said track-rails.

3. A device of the type described, including a track-way formed of upper surface grooved rails, each rail being constituted of complementally grooved longitudinal members or sections, chair plates receiving said longitudinal members or sections and having upstanding studs received between said sections or members, said rail-members or sections having approaches embedded in a plastic material conformed to the outline of the grooved surface of said rails.

In testimony whereof, I affix my signature, in presence of two witnesses.

JOHN A. GROSE.

Witnesses:
 MARY E. LARKIN,
 F. E. HANNIX.